US011343067B2

(12) United States Patent
Akondy Raja Raghupathi

(10) Patent No.: US 11,343,067 B2
(45) Date of Patent: *May 24, 2022

(54) SAMPLING POINT IDENTIFICATION FOR LOW FREQUENCY ASYNCHRONOUS DATA CAPTURE

(71) Applicant: TEXAS INSTRUMENTS INCORPORATED, Dallas, TX (US)

(72) Inventor: Venkataratna Subrahmanya Bharathi Akondy Raja Raghupathi, Cypress, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,684

(22) Filed: Nov. 10, 2020

(65) Prior Publication Data

US 2021/0058226 A1    Feb. 25, 2021

Related U.S. Application Data

(63) Continuation of application No. 16/457,207, filed on Jun. 28, 2019, now Pat. No. 10,862,666.
(Continued)

(51) Int. Cl.
*H04L 7/033* (2006.01)
*H04L 7/00* (2006.01)

(52) U.S. Cl.
CPC .......... *H04L 7/0331* (2013.01); *H04L 7/0087* (2013.01); *H04L 7/0041* (2013.01)

(58) Field of Classification Search
CPC ......... G06F 1/324; G06F 1/08; H04L 7/0338; H04L 7/033; H04L 7/0331; H04L 7/0087; H03K 5/1534
See application file for complete search history.

(56) References Cited

U.S. PATENT DOCUMENTS 4,984,255 A    1/1991  Davis
5,155,486 A   10/1992  Murfet et al.
(Continued)

FOREIGN PATENT DOCUMENTS

WO    WO 2002/049314 A2    6/2002
WO    WO 2005/122509 A1   12/2005

OTHER PUBLICATIONS

PCT International Search Report; PCT/US 2020/013436; dated May 14, 2020; 2 pages.
(Continued)

*Primary Examiner* — Khanh C Tran
(74) *Attorney, Agent, or Firm* — Ebby Abraham; Charles A. Brill; Frank D. Cimino

(57) ABSTRACT

An asynchronous data capture device comprises an edge spread detector circuit, a clock generator, and a data sampling circuit. The edge spread detector circuit uses a first clock frequency that is a multiple of a second clock frequency, identifies transitions in a data stream transmitted to the device at the second clock frequency, and determines a sampling point based on the identified transitions. The clock generator adjusts a phase offset based on the sampling point and generates a clock signal having the second clock frequency and the adjusted phase offset. The data sampling circuit uses the second clock frequency and samples the data stream at the sampling point. In some implementations, the edge spread detector determines a sampling point that is isolated from the identified transitions, and the clock generator adjusts the phase offset to cause a rising edge at the sampling point.

22 Claims, 4 Drawing Sheets

Related U.S. Application Data

(60) Provisional application No. 62/792,061, filed on Jan. 14, 2019.

(56) References Cited

U.S. PATENT DOCUMENTS

| | | | |
|---|---|---|---|
| 6,359,946 B1 | 3/2002 | Ryan | |
| 6,392,641 B1 | 5/2002 | Nishimura | |
| 6,472,913 B2* | 10/2002 | Natsume | H04L 7/0338 |
| | | | 327/141 |
| 6,775,345 B1 | 8/2004 | Song | |
| 7,315,594 B2* | 1/2008 | Schmatz | H03L 7/0814 |
| | | | 375/355 |
| 7,426,252 B1* | 9/2008 | Chuang | H04L 7/0338 |
| | | | 375/219 |
| 7,965,801 B1* | 6/2011 | O'Reilly | H04L 7/0338 |
| | | | 375/355 |
| 8,831,064 B1 | 9/2014 | Kaviani | |
| 9,363,119 B1 | 6/2016 | Gudi | |
| 2004/0208270 A1* | 10/2004 | Schmatz | H04L 7/0331 |
| | | | 375/355 |
| 2006/0002498 A1* | 1/2006 | Pickering | H04L 25/069 |
| | | | 375/355 |
| 2006/0045224 A1* | 3/2006 | Cranford | H04L 7/0337 |
| | | | 375/355 |
| 2011/0316600 A1* | 12/2011 | Lin | H03L 7/06 |
| | | | 327/161 |
| 2013/0091392 A1* | 4/2013 | Valliappan | H04L 7/0331 |
| | | | 714/700 |
| 2013/0163706 A1* | 6/2013 | Tai | H04L 7/0338 |
| | | | 375/354 |
| 2013/0191679 A1 | 7/2013 | Zhuang | |
| 2013/0216003 A1 | 8/2013 | Zhuang | |
| 2017/0366330 A1 | 12/2017 | Chan | |

OTHER PUBLICATIONS

Extended European Search Report; Application No./Patent No. 20741017.6-1205/3912303 PCT/US2020013436; dated Feb. 11, 2022.

* cited by examiner

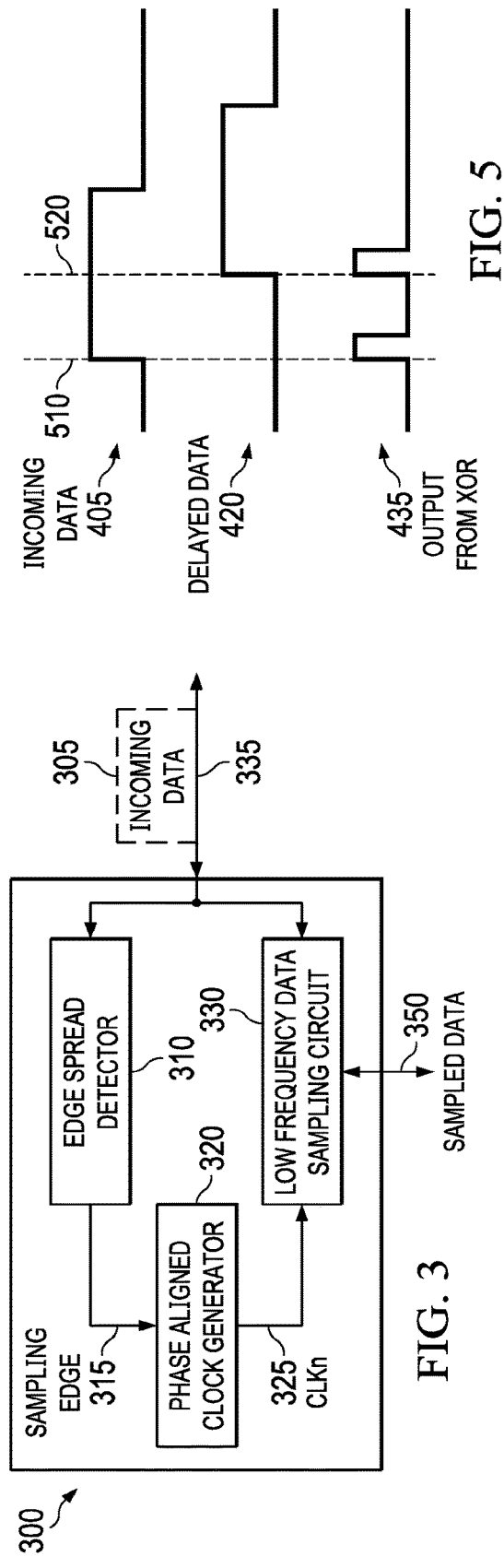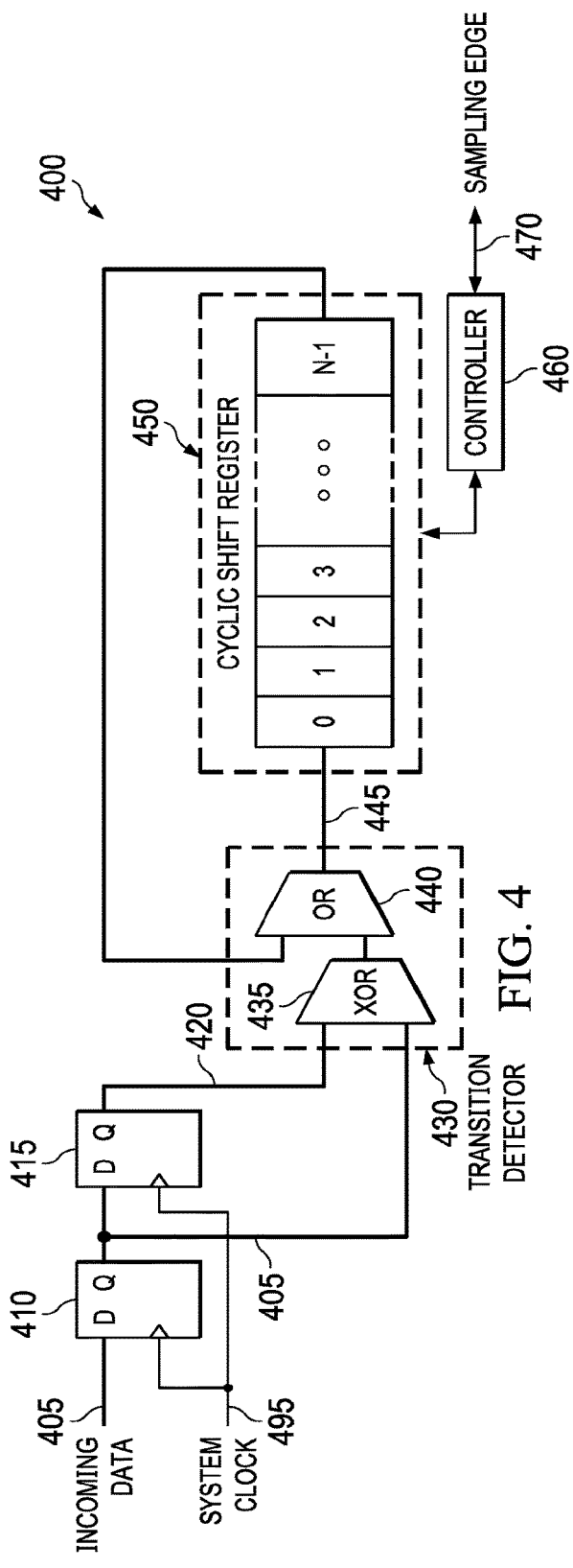

SAMPLING POINT IDENTIFICATION FOR LOW FREQUENCY ASYNCHRONOUS DATA CAPTURE

CROSS-REFERENCE TO RELATED APPLICATIONS

This application is a continuation of U.S. patent application Ser. No. 16/457,207, filed Jun. 28, 2019, which claims priority to U.S. Provisional Application No. 62/792,061, filed Jan. 14, 2019, both of which are hereby incorporated by reference.

BACKGROUND

In asynchronous communication systems, the communicating endpoints do not share a common clock signal, and instead rely on start and stop signals within the data stream itself. Conventional asynchronous communication receivers oversample the incoming data stream, often by a factor of four or eight. For example, for each bit of incoming data, the receiver samples the incoming data eight times, resulting in eight bits of acquired data. The eight bits of acquired data are then processed to determine the value of the one incoming data bit, such as by majority polling or other filtering methods.

Oversampling by a factor of eight requires the receiver to operate at a high frequency clock rate, eight times the anticipated data clock rate. Operating at such a high frequency clock rate and performing extensive post-sampling processing to determine the value of the incoming data bit are resource intensive for the receiver. The receiver must perform high speed data capture, store the acquired bits in large data buffers, transfer large amounts of data, and the like. The resource intensive nature of these conventional oversampling and post-sampling processing techniques are difficult to implement on conventional microcontrollers with limited bandwidths and system clock frequencies.

SUMMARY

An asynchronous data capture device comprises an edge spread detector circuit, a clock generator coupled to the edge spread detector circuit, and a data sampling circuit coupled to the clock generator. The edge spread detector circuit is configured to use a first clock frequency that is a multiple of a second clock frequency. The edge spread detector circuit is further configured to identify transitions in a data stream transmitted to the data capture device at the second clock frequency and determine a sampling point based on the identified transitions in the data stream. The clock generator is configured to adjust a phase offset based on the sampling point and generate a clock signal having the second clock frequency and the adjusted phase offset. The data sampling circuit is configured to use the second clock frequency and sample the data stream at the sampling point.

In some implementations, the edge spread detector circuit is configured to determine the sampling point such that the sampling point is isolated from the identified transitions. In some implementations, the clock generator is configured to adjust the phase offset based on the sampling point such that the clock signal has a rising edge at the sampling point. In some implementations, the edge spread detector circuit comprises an edge detector sub-circuit and a shift register coupled to the edge detector sub-circuit. The edge detector sub-circuit is configured to receive the data stream and identify transitions in the data stream. In some implementations, the shift register comprises a cyclic shift register.

In some implementations, the edge detector sub-circuit comprises a first flip flop having an input to receive the data stream and a second flip flop coupled to the first flip flop. The edge detector sub-circuit also comprises a first logic gate coupled to the first and second flip flops and a second logic gate coupled to the first logic gate and an output of the shift register. In some implementations, the first logic gate is an XOR logic gate and the second logic gate is an OR logic gate.

A method for sampling data in an asynchronous communication interface system comprises oversampling an incoming data stream at a system clock frequency, and identifying transitions in the incoming data stream. The method also comprises determining an edge spread for a data clock frequency of the incoming data stream, wherein the system clock frequency is a multiple of the data clock frequency, and determining a sampling point based on the determined edge spread. The method also comprises adjusting a phase offset based on the determined sampling point and generating a clock signal having the data clock rate and the adjusted phase offset. The method also comprises sampling the incoming data stream at the data clock frequency based on the generated clock signal.

In some implementations, the method further comprises adjusting the phase offset such that the generated clock signal has a rising edge at the sampling point. In some implementations, the method further comprises determining the sampling point is isolated from the determined edge spread. In those implementations, the method further comprises verifying the sampling point is isolated from the determined edge spread. In response to the sampling point being isolated from the determined edge spread, the method comprises sampling the incoming data stream. In response to the sampling point not being isolated from the determined edge spread, the method comprises determining a revised sampling point. In some implementations, the revised sampling point is based on a revised edge spread.

BRIEF DESCRIPTION OF THE DRAWINGS

For a detailed description of various examples, reference will now be made to the accompanying drawings in which:

FIG. 3 illustrates, in block diagram form, an example receiver included in an asynchronous communication interface system.

FIG. 4 illustrates, in block diagram form, an example edge spread detector.

FIG. 5 illustrates an example timing diagram for components in an example edge spread detector.

DETAILED DESCRIPTION

Conventional techniques of oversampling and post-sampling processing in asynchronous communication systems are resource intensive and often difficult to implement on devices with limited bandwidth and system clock frequencies. The disclosed asynchronous communication devices use oversampling to determine an edge spread for a data clock frequency of incoming data, and select an appropriate sampling point based on the edge spread. The disclosed asynchronous communication devices sample the incoming data at the appropriate sampling point, based on a low frequency clock corresponding to the data clock frequency. This limits the resource intensive oversampling technique to learning the edge spread rather than for receiving all incoming data, reducing power consumption, and reduces the memory and processing power used for analyzing the oversampled bits.

An example asynchronous communication device includes an edge spread detector circuit, a clock generator, and a data sampling circuit. The edge spread detector circuit uses a high frequency system clock, and identifies transitions in an incoming data stream. The edge spread detector also selects a sampling point based on the identified transitions. In some implementations, the edge spread detector circuit selects a sampling point that is isolated from the determined edge spread of the incoming data stream. The clock generator adjusts a phase offset based on the sampling point, and generates a low frequency clock signal with the adjusted phase offset. The data sampling circuit uses a low frequency clock based on the clock signal generated by the clock generator, and samples the incoming data stream at the sampling point.

In some implementations, the clock generator adjusts the phase offset such that the generated clock signal has a rising edge at the sampling point. In some examples, the edge spread detector circuit comprises an edge detector sub-circuit and a shift register. The edge detector sub-circuit includes two flip flops configured to provide the incoming data stream and a delayed copy of the incoming data stream to an XOR logic gate, which identifies transitions in the incoming data stream. An OR logic gate compares the output of the XOR logic gate with the output of the shift register, and outputs the result to the shift register. This ensures that variations in the incoming clock data rate due to clock jitter and the like are represented in the edge spread.

Figure 1:
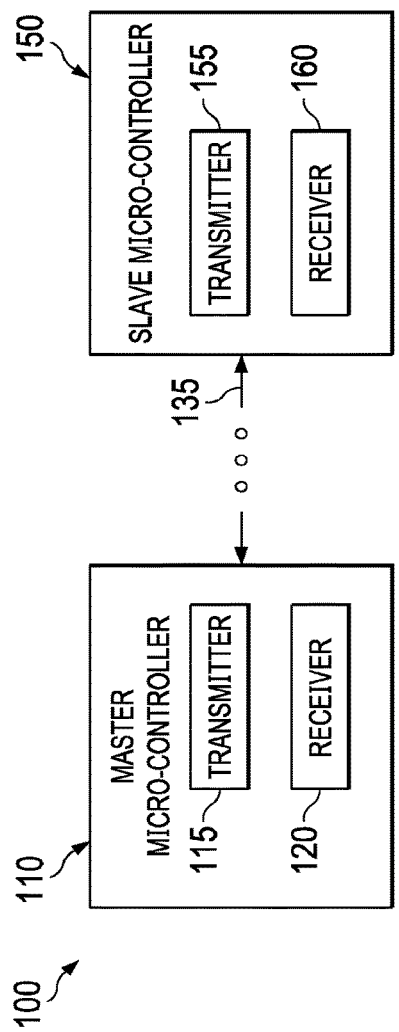
FIG. 1 illustrates an example asynchronous communication interface system.

FIG. 1 illustrates an example of a conventional asynchronous communication interface system 100. Communication interface system 100 can be implemented in any variety of master/slave communication applications, such as for a position encoder system. Communication interface system 100 includes a master microcontroller 110 and a slave microcontroller 150 that are interconnected by a communication cable 135. Because master microcontroller 110 and slave microcontroller 150 may be hundreds of meters apart, the number of cables between them is minimized to reduce costs. Thus, master microcontroller 110 and slave microcontroller 150 are configured to implement asynchronous communication over communication cable 135 and do not share a common clock signal.

Master microcontroller 110 includes a transmitter 115 and a receiver 120, and slave microcontroller 150 includes a transmitter 155 and a receiver 160. Communication cable 135 is configured to send signals between the master microcontroller 110 and slave microcontroller 150, such as a master data signal request from master microcontroller 110 to slave microcontroller 150 and slave data signals from slave microcontroller 150 to master microcontroller 110. Accordingly, communication interface system 100 can be implemented for asynchronous bidirectional communication over cable 135.

Figure 2:
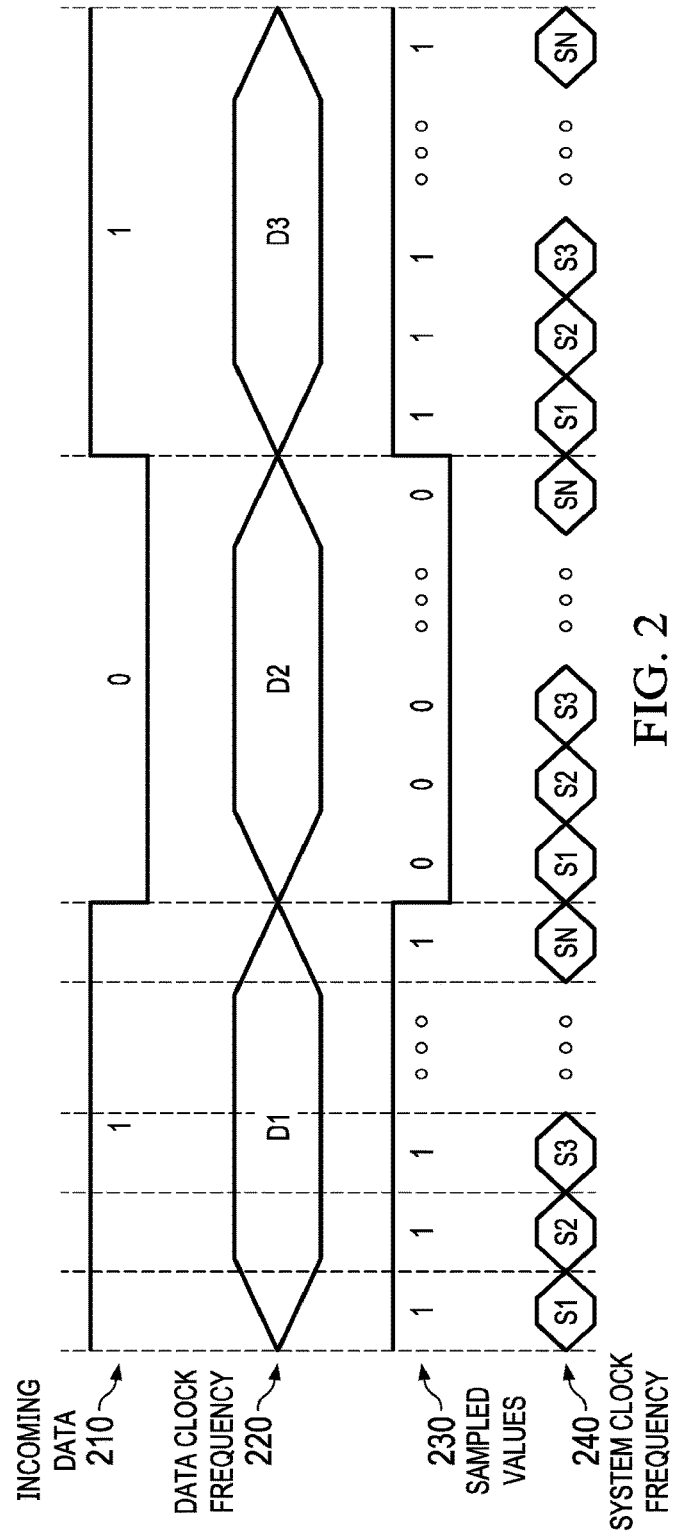
FIG. 2 illustrates an example timing diagram for an asynchronous communication interface system.

FIG. 2 illustrates an example timing diagram for an asynchronous communication interface system, such as asynchronous communication interface system 100 shown in FIG. 1. Incoming data 210 shows the value of the data sent from slave microcontroller 150 to master microcontroller 110, and data clock frequency 220 shows the clock frequency Fd at which slave microcontroller 150 sends data 210. Sampled values 230 show the values of the samples master microcontroller 110 takes of data 210, and system clock frequency 240 shows the clock frequency Fs at which master microcontroller 110 samples incoming data 210.

Master microcontroller 110 and slave microcontroller 150 do not share a common clock signal, and so master microcontroller 110 oversamples incoming data 210 at frequency Fs 240, such that for every one bit of incoming data D, N samples are taken and result in N acquired bits. The relationship between data clock frequency 220 and system clock frequency 240 is represented as Fs=(N)(Fd). Master microcontroller 110 then performs majority polling or other filtering on sampled values 230 to identify the correct data value for each incoming data bit D. For example, master microcontroller 110 performs majority polling on the acquired bits corresponding to system clock periods S1-SN in sampled values 230 to determine the correct data value for incoming data bit D1. Oversampling and post-sample processing are resource intensive, requiring high speed data capture, large data buffers, high bandwidth for large amounts of data to be transferred, and the like.

FIG. 3 illustrates, in block diagram form, an example microcontroller 300 included in a data capture device for an asynchronous communication interface system. Microcontroller 300 includes an edge spread detector 310, a phase aligned clock generator 320, and a low speed data capture circuit 330. Microcontroller 300 receives incoming data 305 over a communication cable 335, similar to master microcontroller 110 and communication cable 135. Edge spread detector 310 operates at a higher frequency system clock rate, such as system clock frequency 240 shown in FIG. 2, and receives incoming data 305. Edge spread detector 310 outputs a sampling edge 315 to phase aligned clock generator 320. Sampling edge 315, also called sampling point 315, indicates a stable point in each bit D of the incoming data 305 at which to sample data 305, away from edge points of data transition.

Phase aligned clock generator 320 generates a low frequency clock signal CLKn 325 with a phase offset such that the rising edge of CLKn 325 occurs at the received sampling edge 315. The low frequency clock signal corresponds to the frequency of the incoming data 305, such as data clock frequency 220. Low frequency data sampling circuit 330 receives and samples incoming data 305 at the rising edge of low frequency clock signal CLKn 325, and outputs a sampled data signal 350. Only edge spread detector 310 and phase aligned clock generator 320 operate at the high frequency clock signal, such as sample clock frequency 240. Low frequency data sampling circuit 330 need not oversample incoming data 305 or perform post-capture data processing to identify an appropriate data value, because it samples incoming data 305 at a stable point for each data period, away from edge points of data transition.

FIG. 4 illustrates, in block diagram form, an example edge spread detector 400. Edge spread detector 400 includes a first flip flop 410, a second flip flop 415, a transition detector 430, a cyclic shift register 450, and a controller 460. Transition detector 430 includes an XOR logic gate 435 and an OR logic gate 440. Flip flop 410 receives incoming data 405 and a system clock signal Fs 495, and outputs data 405 substantially unchanged. Flip flop 415 receives the output of flip flop 410 and the system clock signal Fs 495, and outputs a delayed copy of incoming data 405, delayed data 420. Transition detector 430 receives the incoming data 405, delayed data 420, and the output of the last bit of cyclic shift register 450 before it is fed back into the first bit of cyclic shift register 450. Transition detector 430 outputs the spread of data transitions in incoming data 405 to cyclic shift register 450.

XOR logic gate 435 in transition detector 430 receives incoming data 405 and delayed data 420, and outputs identified edges in incoming data 405 and delayed data 420. FIG. 5 illustrates example inputs to and outputs from XOR logic gate 435. XOR 435 outputs a signal indicative of the rising edges in incoming data 405 at 510 and delayed data 420 at 520. OR logic gate 440 receives the output of XOR logic gate 435 and the output of the last bit of cyclic shift register 450, and outputs a signal 445 into cyclic shift register 450. Signal 445 indicates transition points in incoming data 405, such that variations in the incoming data clock frequency Fd are identified.

Cyclic shift register 450 comprises N bits, based on the incoming data clock frequency Fd and the system clock frequency Fs 495. For example, system clock frequency Fs 495 equals N times the incoming data clock frequency Fd. Controller 460 reads the bits in cyclic shift register 450 and identifies stable points in incoming data 405, away from data transition points. Controller 460 determines an appropriate sampling point for an associated low frequency data capture circuit to sample incoming data 405, and outputs sampling edge 470.

Figure 6A:
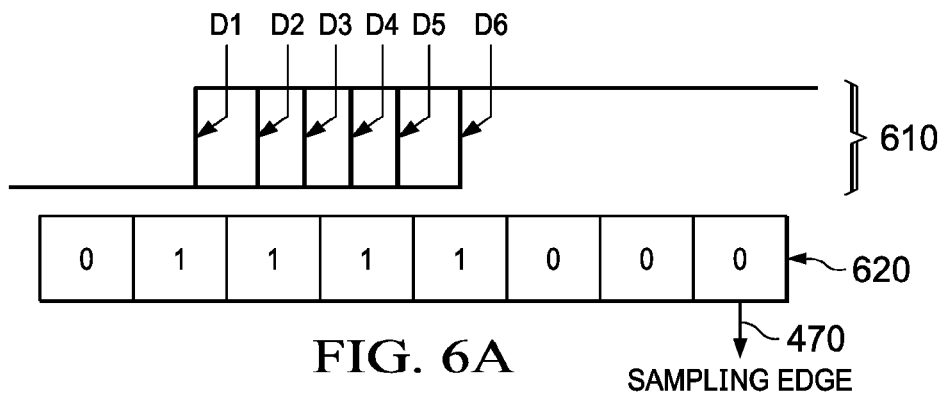
FIGS. 6A-B illustrates example values in a shift register for two different edge spreads.
Figure 6B:
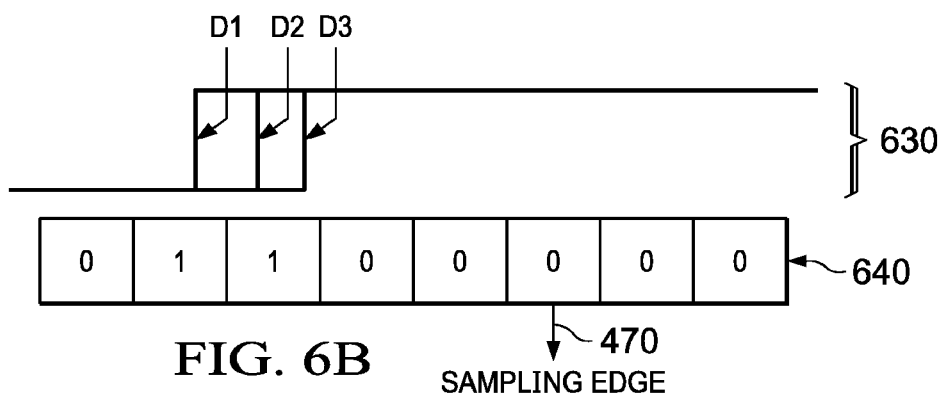

FIGS. 6A-B illustrate example values in shift register 450 for two different edge spreads, and the corresponding sampling edges 470. Edge spread representation 610 in FIG. 6A shows the overlaid rising edges for six incoming data bits D1-D6. Shift register values 620 represent the values stored in shift register 450 based on the output of transition detector 430 when the data bits D1-D6 are input to it. The N shift register values represent the N samples of the incoming data taken for each data bit D, ones represent the samples identified as transition points in data bits D1-D6 and zeros represent the samples identified as stable values in data bits D1-D6. Sampling edge 470 is chosen from shift register values 620 from the cluster of zeros indicating stable data values. Edge spread representation 630 in FIG. 6B shows the overlaid rising edges for three incoming data bits D1-D3. Shift register values 640 represent the values stored in shift register 450 based on the output of transition detector 430 when the data bits D1-D3 are input to it. Sampling edge 470 is chosen from shift register values 640 from the cluster of zeros indicating stable data values.

Figure 7:
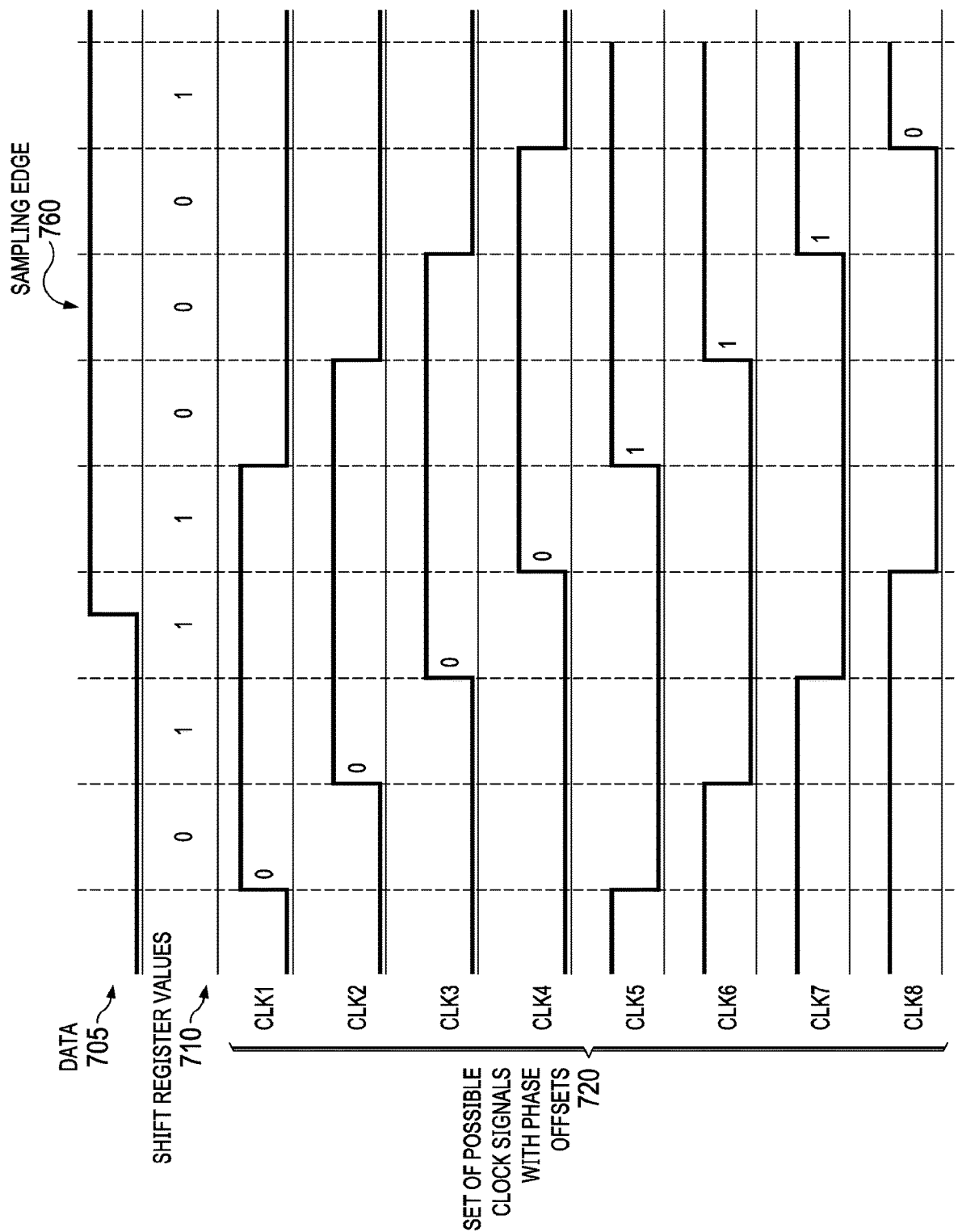
FIG. 7 illustrates different phase shifted clock signals which may be generated by a phase aligned clock generator.

FIG. 7 illustrates different phase shifted clock signals which may be generated by a phase aligned clock generator, such as phase aligned clock generator 320 shown in FIG. 3. Shift register values 710 indicate the values stored in an associated shift register based on identified transitions in incoming data 705. Sampling edge 760 is chosen from shift register values 710 from the cluster of zeros indicating stable data values. The set of clock signals 720 comprise possible low frequency clock signals and phase offsets the phase aligned clock generator can generate. The phase offsets between each of clock signals CLK1-CLK8 correspond to a high frequency system clock, in that each clock signal CLK1-CLK8 has a unique rising edge corresponding to a different clock period S of the high frequency system clock Fs during a data period D. Clock signals CLK1-CLK8 have a frequency corresponding to the incoming data clock frequency Fd, lower than the system clock frequency Fs.

The phase aligned clock generator receives sampling edge 760 and generates the clock signal with a phase offset corresponding to the sampling edge 760, CLK6 in this example. The low frequency, phase offset clock signal CLK6 can be provided to a low frequency data sampling circuit, such as data sampling circuit 330 shown in FIG. 3, which will sample incoming data 705 at the rising edge of clock signal CLK6. This allows the low frequency data capture circuit to sample incoming data 705 at a stable data value point and avoid resource-intensive oversampling and majority polling or other post-sampling data processes.

Figure 8:
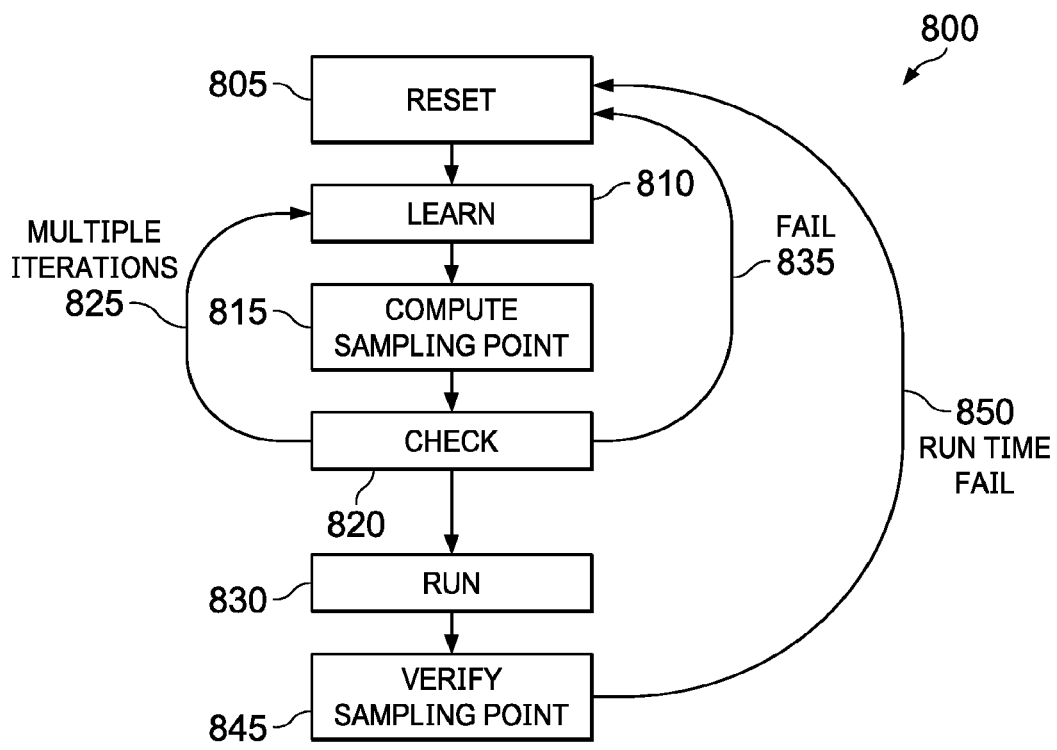
FIG. 8 illustrates a state diagram for identification and selection of an appropriate low frequency phase adjusted clock signal in an example asynchronous communication system.

FIG. 8 illustrates a flowchart for a process 800 for identification and selection of an appropriate low frequency phase adjusted clock signal in example asynchronous communication system 300 shown in FIG. 3. The process begins at reset 805, and continues to learn 810. Edge spread detector 310 samples incoming data 305 to identify transitions. The amount of data needed to sufficiently identify the edge spread of the data clock depends on noise in the communication system. For example, in some implementations several packets of data amounting to one or more kilobytes of data are needed to confidently identify the edge spread of the incoming data clock.

At 815, edge spread detector 310 determines an appropriate sampling point based on the identified transitions. At 820, asynchronous communication system 300 compares the determined sampling point to the incoming data to confirm the sampling point captures a stable data value. In initial system set up, asynchronous communication system 300 performs multiple iterations 825 of steps 810-820. The number of iterations depends in part on the noise of communication system 300, with more iterations needed in response to more noise. Once an appropriate sampling point is confirmed at step 820 and no further iterations are needed, asynchronous communication system 300 runs at step 830, sampling incoming data at a low frequency at the sampling point it determined in step 815.

If asynchronous communication system 300 determines the sampling point differs from a stable data value point for too many iterations of steps 810-820 in a row, identifying a failure at step 835, it returns to the system reset at step 805. Periodically during system run at step 830, asynchronous communication system 300 verifies the sampling point at step 845. If the system determines the sampling point has failed during run time at step 850, such as in response to a failure of another component in the communication system, asynchronous communication system 300 returns to system reset at step 805 and determines a new sampling point.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An asynchronous data capture device, comprising:
   a detector circuit configured to:
   receive a data stream;
   identify transitions in the data stream;
   determine a sampling point based on the identified transitions in the data stream;
   a clock generator coupled to the detector circuit and configured to:
   adjust a phase offset based on the sampling point, and
   generate a clock signal having the adjusted phase offset; and
   a data sampling circuit coupled to the clock generator and configured to:
   sample the data stream at the sampling point.

2. The data capture device of claim 1, wherein the clock generator is configured to adjust the phase offset based on the sampling point such that the clock signal has a rising edge at the sampling point.

3. The data capture device of claim 1, wherein the detector circuit is configured to determine the sampling point such that the sampling point is isolated from the identified transitions.

4. The data capture device of claim 1, wherein the detector circuit comprises:
   an edge detector sub-circuit configured to receive the data stream and identify transitions in the data stream; and
   a shift register coupled to the edge detector sub-circuit.

5. The data capture device of claim 4, wherein the shift register comprises a cyclic shift register.

6. The data capture device of claim 4, wherein the edge detector sub-circuit comprises:
   a first flip flop having an input configured to receive the data stream;
   a second flip flop coupled to the first flip flop;
   a first logic gate coupled to the first and the second flip flops; and
   a second logic gate coupled to the first logic gate and an output of the shift register.

7. The data capture device of claim 6, wherein the first logic gate is an XOR logic gate.

8. The data capture device of claim 6, wherein the second logic gate is an OR logic gate.

9. A device comprising:
   a data terminal;
   a first clock generator;
   a detector circuit having an input coupled to the data terminal and having a clock input coupled to an output of the first clock generator;
   a second clock generator having an input coupled to an output of the detector circuit and having an output to provide a clock signal with an adjusted phase offset, wherein the second clock generator is configured to adjust the phase offset based on the output of the detector circuit; and
   a data capture circuit having a first input coupled to the data terminal and having a clock input coupled to an output of the second clock generator, the data capture circuit having a data output.

10. The device of claim 9, wherein the first clock generator is configured to output a first clock signal with a first clock frequency.

11. The device of claim 10, wherein the second clock generator is configured to output the clock signal with a second clock frequency, and wherein the first clock frequency is a multiple of the second clock frequency.

12. The device of claim 11, wherein the second clock frequency corresponds to a clock frequency for a data stream received by the data terminal.

13. The device of claim 9, wherein the output of the detector circuit comprises a sampling point.

14. The device of claim 13, wherein the sampling point is isolated from transitions in a data stream received by the data terminal.

15. The device of claim 9, wherein the detector circuit comprises:
   an edge detector sub-circuit having an input coupled to the data terminal; and
   a shift register having an input coupled to an output of the edge detector sub-circuit.

16. The device of claim 15, wherein the shift register comprises a cyclic shift register.

17. The device of claim 15, wherein the edge detector sub-circuit comprises:
   a first flip flop having an input coupled to the data terminal;
   a second flip flop having an input coupled to an output of the first flip flop;
   a first logic gate having a first input coupled to the output of the first flip flop and having a second input coupled to an output of the second flip flop; and
   a second logic gate having a first input coupled to an output of the first logic gate and having a second input coupled to an output of the shift register.

18. The device of claim 17, wherein the first logic gate comprises an XOR logic gate.

19. The device of claim 17, wherein the second logic gate comprises an OR logic gate.

20. A method for sampling data in an asynchronous communication interface system, comprising:
   oversampling an incoming data stream using a system clock frequency;
   identifying transitions in the incoming data stream;
   determining a sampling point based on the identified transitions in the incoming data stream;
   adjusting a phase offset based on the determined sampling point;
   generating a clock signal having the data clock frequency and the adjusted phase offset; and
   sampling the incoming data stream using the data clock frequency based on the generated clock signal.

21. The method of claim 20, wherein adjusting the phase offset based on the determined sampling point comprises adjusting the phase offset such that the generated clock signal has a rising edge at the sampling point.

22. The method of claim 20, wherein determining the sampling point such that the sampling point is isolated from the determined edge spread.

* * * * *